(12) United States Patent
DiFoggio et al.

(10) Patent No.: US 10,718,879 B2
(45) Date of Patent: Jul. 21, 2020

(54) CUMULATIVE DAMAGE SENSORS FOR DOWNHOLE COMPONENTS TO MONITOR ENVIRONMENTAL DAMAGE THEREOF

(71) Applicants: Rocco DiFoggio, Houston, TX (US); Thomas Kruspe, Wietzendorf (DE)

(72) Inventors: Rocco DiFoggio, Houston, TX (US); Thomas Kruspe, Wietzendorf (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 117 days.

(21) Appl. No.: 15/843,193

(22) Filed: Dec. 15, 2017

(65) Prior Publication Data

US 2019/0187321 A1  Jun. 20, 2019

(51) Int. Cl.
*G01V 3/34* (2006.01)
*G01N 17/00* (2006.01)
*G01V 3/18* (2006.01)
*G01N 17/04* (2006.01)

(52) U.S. Cl.
CPC .............. *G01V 3/34* (2013.01); *G01N 17/00* (2013.01); *G01N 17/043* (2013.01); *G01V 3/18* (2013.01)

(58) Field of Classification Search
CPC ........ G01N 17/00; G01N 17/043; G01V 3/34; G01V 3/18
USPC ............ 324/323, 525, 691, 700, 71.2; 374/7
See application file for complete search history.

(56) References Cited

U.S. PATENT DOCUMENTS

| 4,655,077 A * | 4/1987 | Purvis | B04C 11/00 73/86 |
| 5,581,019 A * | 12/1996 | Minor | C08J 9/32 285/910 |
| 6,208,128 B1 * | 3/2001 | Braconnier | G01B 7/06 324/700 |
| 6,686,752 B1 * | 2/2004 | Heumann | B01D 45/12 324/700 |
| 6,945,098 B2 * | 9/2005 | Olson | B04C 11/00 138/36 |

(Continued)

FOREIGN PATENT DOCUMENTS

| WO | 2015034516 A1 | 3/2015 |
| WO | 2016172268 A1 | 10/2016 |

OTHER PUBLICATIONS

"Isochoric Properties for Propane"; NIST Chemistry WebBook, SRD 69; 2017 U.S. Secretary of Commerce; retrieved from the Internet on Aug. 21, 2017: http://webbook.nist.gov.; 3 pages.

(Continued)

*Primary Examiner* — Jay Patidar
(74) *Attorney, Agent, or Firm* — Cantor Colburn LLP (57) ABSTRACT

Systems and sensor elements for indirect monitoring of cumulative damage to downhole components are described. The systems include a sensor body defining an internal cavity with at least one electrical wear element located within the sensor body. A portion of the at least one electrical wear element electrically extends from the internal cavity, through the sensor body, and to an exterior of the sensor body. An abrasive substance is located within the internal cavity, the abrasive substance being moveable within the internal cavity to contact and erode material of the at least one electrical wear element such that erosion of the at least one electrical wear element causes a resistance of the at least one electrical wear element to increase.

20 Claims, 5 Drawing Sheets

(56) References Cited

U.S. PATENT DOCUMENTS

| | | | |
|---|---|---|---|
| 9,004,195 | B2 | 4/2015 | Regener et al. |
| 9,624,729 | B2 | 4/2017 | Sullivan et al. |
| 2005/0069016 | A1 | 3/2005 | Martin et al. |
| 2005/0275216 | A1* | 12/2005 | Martin ................. B65G 53/523 285/45 |
| 2010/0326654 | A1 | 12/2010 | Hemblade |
| 2015/0240627 | A1* | 8/2015 | Gao ...................... E21B 47/122 422/82.02 |

OTHER PUBLICATIONS

"Abrasive Blasting", [retrieved from the internet via Wikipedia on Jul. 28, 2017], https://en.wikipedia.org/wiki/Abrasive_blasting; 9 pages.

"How to Sandblast", [Retrieved from the Internet on Jul. 28, 2017], http://how-to-sandblast.com/; 13 pages.

Andrews, David Richard "The Erosion of Metals", A dissertation submitted to the University of Cambridge for the degree of Doctor of Philosophy, May 1980; 156 pages.

Jehring, et al. "Damping of Structure-borne Sound with Particle-filled Metal Hollow Spheres", 2008; 6 pages.

Kramer Industries, Inc. "Blasting Media Comparison Chart", [Retrieved from the internet on Jul. 28, 2017] http://www.kramerindustriesonline.com/finishing-guides/blasting-media-comparison-chart.htm;3 pages.

Metal Finishing Systems, "Introduction to Blasting", [Retrieved from the internet Jul. 28, 2017], http://www.metalfinishingsystems.com/sites/default/files/Blasting%20Blasting%20Tech%20Tips_0.pdf; 18 pages.

SolarRoadways, "Glass Overview", [Retrieved from the Internet Jul. 28, 2017], http://www.solarroadways.com/Specifics/Glass, 2016; 7 pages.

Sundararajan, et al. "Solid particle erosion behaviour of metallic materials at room and elevated temperatures", Tribology International vol. 30, No. 5, 1997; pp. 339-359.

International Search Report and Written Opinion, International Application No. PCT/US2018/062552, dated Mar. 12, 2019, Korean Intellectual Property Office; International Search Report 4 pages, Written Opinion 7 pages.

* cited by examiner

CUMULATIVE DAMAGE SENSORS FOR DOWNHOLE COMPONENTS TO MONITOR ENVIRONMENTAL DAMAGE THEREOF

BACKGROUND

1. Field of the Invention

The present invention generally relates to downhole components and sensors for monitoring environmental damage of downhole components.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

In operation, the downhole components may be subject to vibrations and various temperatures that can cause wear, fatigue, and/or failure of such components. Furthermore, the combination of high temperatures and vibrations may act synergistically to cause more damage than either of these separately. Thus it is advantageous to provide monitoring of such downhole components to determine whether the components are approaching a critical amount of wear.

SUMMARY

Disclosed herein are systems and sensor elements for indirect monitoring of cumulative damage to downhole components having a sensor body defining an internal cavity, at least one electrical wear element located within the sensor body, wherein a portion of the at least one electrical wear element electrically extends from the internal cavity, through the sensor body, and to an exterior of the sensor body, and an abrasive substance located within the internal cavity, the abrasive substance moveable within the internal cavity to contact and erode material of the at least one electrical wear element, wherein erosion of the at least one electrical wear element causes a resistance of the at least one electrical wear element to increase.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
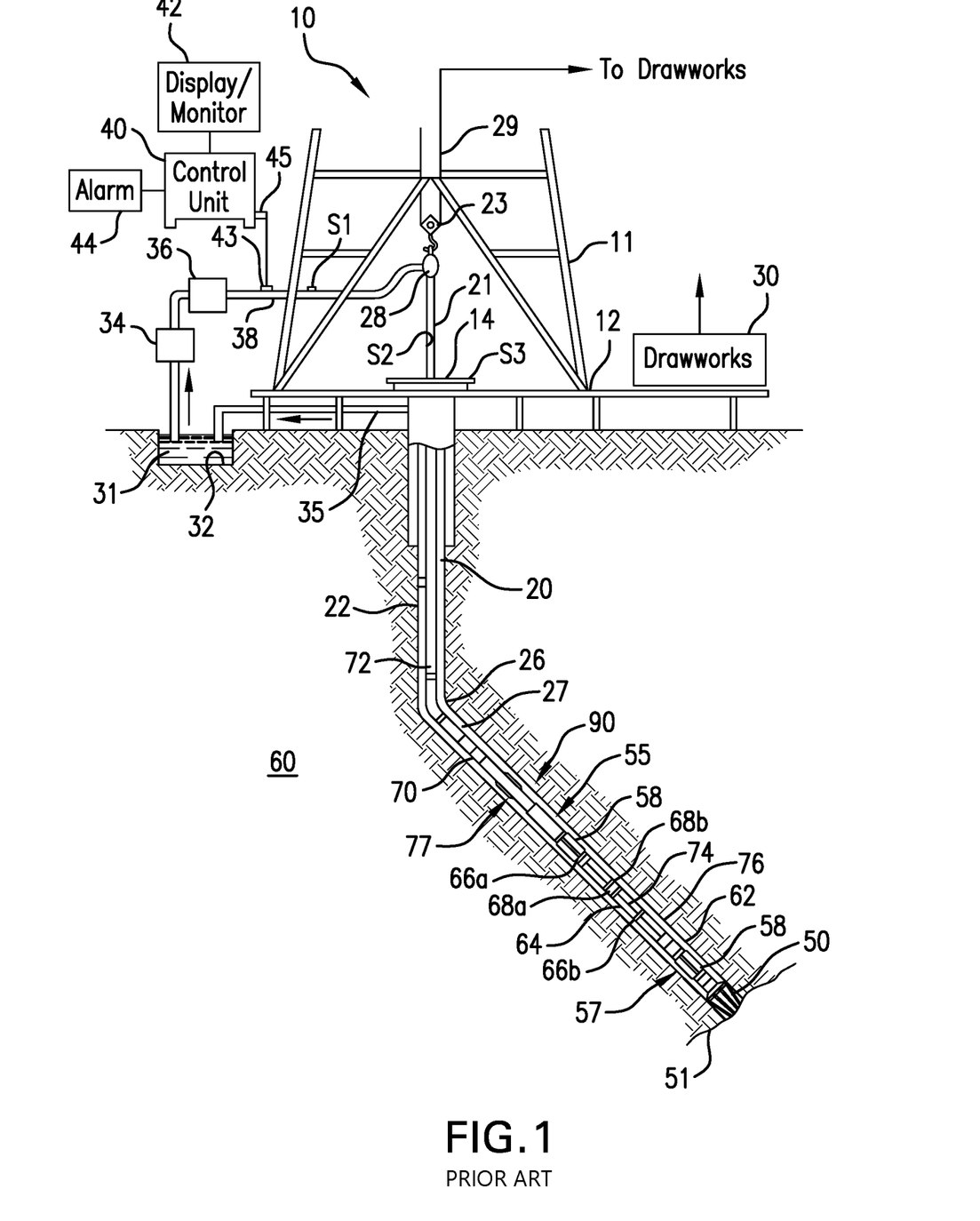
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a transducer 43, such as a pressure transducer, placed in the fluid line 38 as well as from sensors S1, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 including a transmitter and transmits such received signals and data to the appropriate downhole devices. In one aspect, a mud pulse telemetry system may be used to communicate data between the downhole sensors 70 and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive, resonant coupling, or directional coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66a or 66b and/or receivers 68a or 68b. Resistivity can be one formation property that is of interest in making drilling decisions. Those of skill in the art will appreciate that other formation property tools can be employed with or in place of the resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

Figure 2:
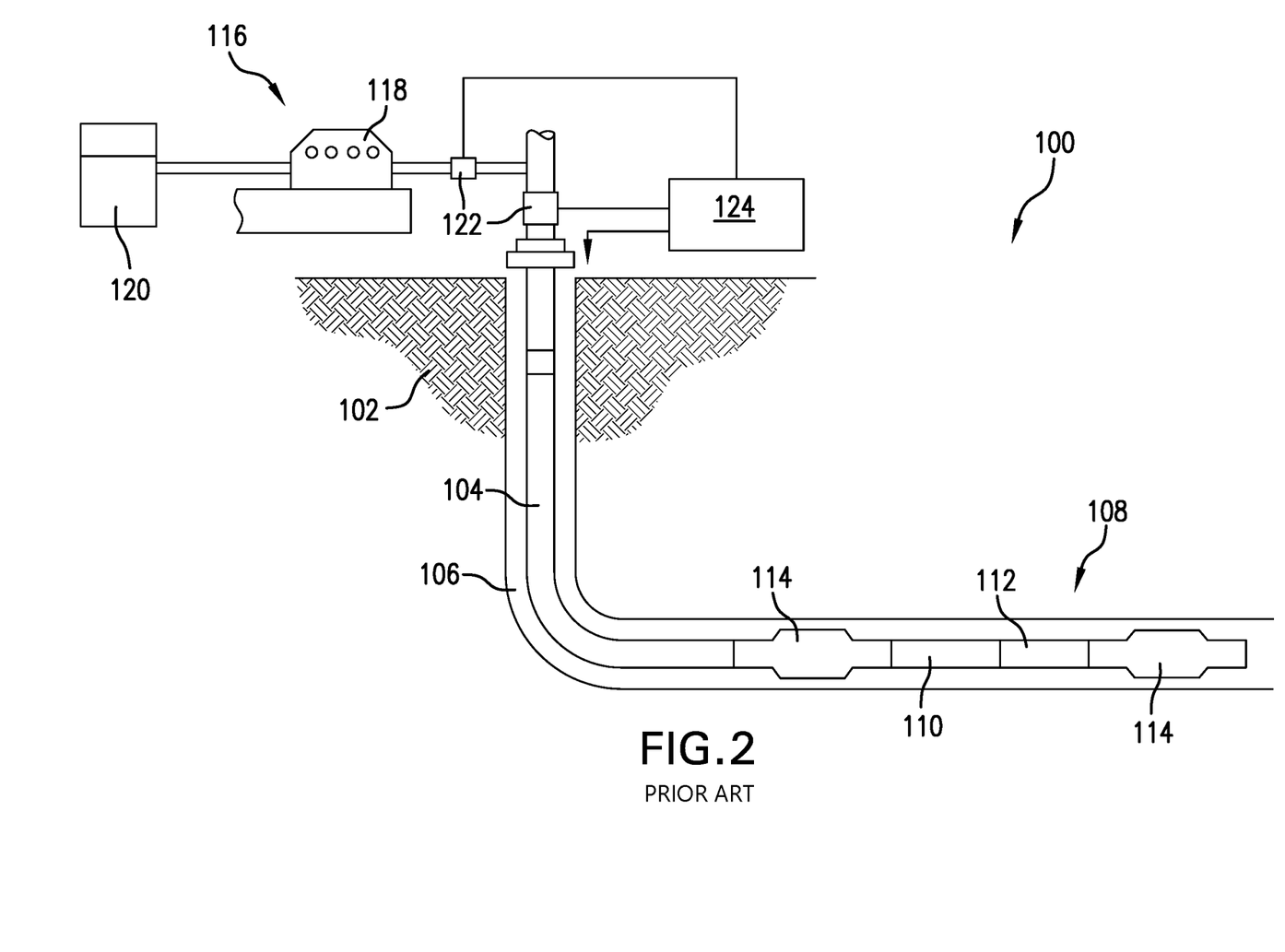
FIG. 2 depicts a system for formation stimulation and hydrocarbon production that can incorporate embodiments of the present disclosure.

Turning to FIG. 2, a schematic illustration of an embodiment of a system 100 for hydrocarbon production and/or evaluation of an earth formation 102 that can employ embodiments of the present disclosure is shown. The system 100 includes a borehole string 104 disposed within a borehole 106. The string 104, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 100 is configured as a hydraulic stimulation system. As described herein, "stimulation" may include any injection of a fluid into a formation. A fluid may be any flowable substance such as a liquid or a gas, or a flowable solid such as sand. In such embodiment, the string 104 includes a downhole assembly 108 that includes one or more tools or components to facilitate stimulation of the formation 102. For example, the string 104 includes a fluid assembly 110, such as a fracture or "frac" sleeve device or an electrical submersible pumping system, and a perforation assembly 112. Examples of the perforation assembly 112 include shaped charges, torches, projectiles, and other devices for perforating a borehole wall and/or casing. The string 104 may also include additional components, such as one or more isolation or packer subs 114.

One or more of the downhole assembly 108, the fracturing assembly 110, the perforation assembly 112, and/or the packer subs 114 may include suitable electronics or processors configured to communicate with a surface processing unit and/or control the respective tool or assembly.

A surface system 116 can be provided to extract material (e.g., fluids) from the formation 102 or to inject fluids through the string 104 into the formation 102 for the purpose of fracking.

As shown, the surface system 116 includes a pumping device 118 in fluid communication with a tank 120. In some embodiments, the pumping device 118 can be used to extract fluid, such as hydrocarbons, from the formation 102, and store the extracted fluid in the tank 120. In other embodiments, the pumping device 118 can be configured to inject fluid from the tank 120 into the string 104 to introduce fluid into the formation 102, for example, to stimulate and/or fracture the formation 102.

One or more flow rate and/or pressure sensors 122, as shown, are disposed in fluid communication with the pumping device 118 and the string 104 for measurement of fluid characteristics. The sensors 122 may be positioned at any suitable location, such as proximate to (e.g., at the discharge output) or within the pumping device 118, at or near a wellhead, or at any other location along the string 104 and/or within the borehole 106.

A processing and/or control unit 124 is disposed in operable communication with the sensors 122, the pumping device 118, and/or components of the downhole assembly 108. The processing and/or control unit 124 is configured to, for example, receive, store, and/or transmit data generated from the sensors 122 and/or the pumping device 118, and includes processing components configured to analyze data from the pumping device 118 and the sensors 122, provide alerts to the pumping device 118 or other control unit and/or control operational parameters, and/or communicate with and/or control components of the downhole assembly 108. The processing and/or control unit 124 includes any number of suitable components, such as processors, memory, communication devices and power sources.

Vibration and thermal fatigue of circuit boards, sensors, or other components (herein after "downhole components") in downhole systems, such as shown and described above, can cause the downhole component to fail, thus requiring maintenance and/or replacement. To reduce the risk of failure, the downhole components can be replaced a regular intervals or on a predetermined schedule, which may be long before the downhole components are expected to actually fail (e.g., preventative maintenance). However, replacing the downhole components prematurely can be costly and, further, such replacement may be unnecessary. Thus, there is a need for a simple, passive, and robust sensor or other monitoring device to measure a cumulative environmental exposure (e.g., vibration exposure, thermal exposure, etc.) that the downhole components experience. For example, such sensors as disclosed herein provide a sensor that wears similarly to provide indirect monitoring of downhole components and to enable determination of whether the downhole components are approaching a critical amount of wear or vibration fatigue.

Figure 3:
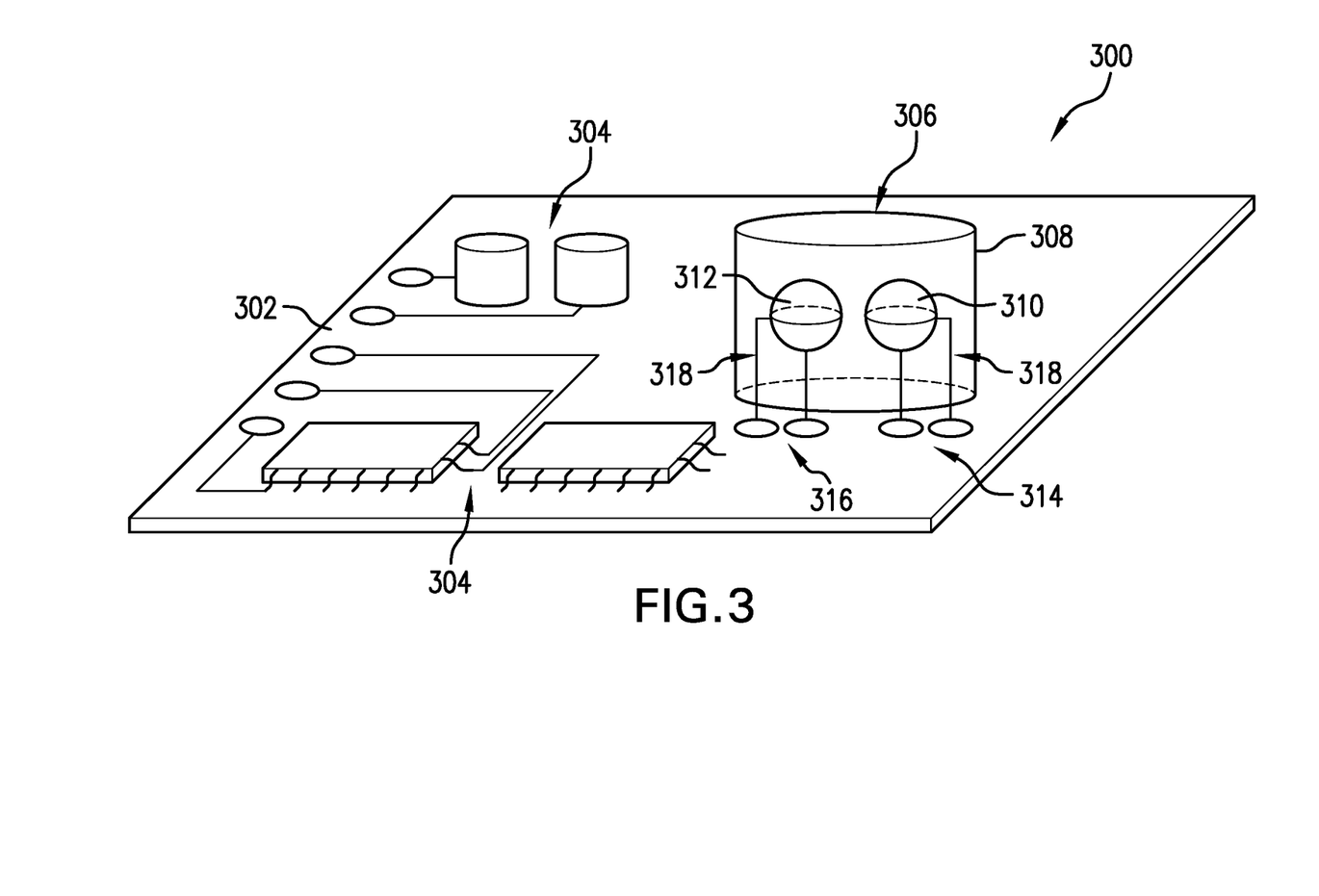
FIG. 3 is a schematic illustration of a monitoring system in accordance with an embodiment of the present disclosure.

Turning now to FIG. 3, a schematic illustration of a monitoring system 300 is shown. The monitoring system 300 is arranged on or in a downhole component 302, such as a printed circuit board. The downhole component 302, although shown as a printed circuit board, can be any downhole component that includes wiring, circuitry, and/or other elements that may suffer from wear, fatigue, and/or failure due to environmental and/or operational conditions, such as vibrations and/or temperature while located downhole. The downhole component 302, in some embodiments, is arranged as part of a downhole tool that is deployed downhole into a borehole. For example, in one non-limiting embodiment, the downhole component 302 is part of a BHA and provides control and/or electrical functionality to at least part of the BHA.

As shown, the downhole component 302 includes one or more electrical elements 304. The electrical elements 304 may be subject to high temperatures and/or vibration during deployment through a borehole, during drilling, exploration, and/or production operations. In some embodiments, the downhole component 302 is configured to electronically control one or more other components of a downhole string or structure.

To enable passive, in situ monitoring of environmental impacts on the downhole component 302, the monitoring system 300 includes a sensor assembly 306. The sensor assembly 306 is fixedly attached to the downhole component 302 and includes a protective housing 308 that is exposed to an environment to which the downhole component 302 is exposed. The sensor assembly 306 is arranged to monitor a cumulative damage or wear that is experience by the downhole component 302. For example, when the downhole component 302 is disposed downhole, the downhole component 302 will be subject to vibrations that may wear or damage the elements of the downhole component 302 (e.g., the electrical elements 304). Each time the downhole component 302 is disposed downhole, the electrical elements 304 will be subject to such vibrations. The sensor assembly 306 (and sensor elements as described herein) are arranged to provide an on-board, passive cumulative damage monitoring of the downhole component 302.

The protective housing 308 isolates one or more sensor elements 310, 312. The sensor elements 310, 312 are arranged or configured to be subject to some environmental impacts that are experienced by the downhole component 302 but are protected or isolated from others, such as high wellbore fluid pressure or corrosive or erosive wellbore fluids, through the protection by the protective housing 308. In some embodiments, the protective housing 308 can be optional or completely absent, depending on the specific configuration of the sensor assembly that is employed. Further, in some embodiments, the protective housing 308 may be openable, allowing for selective access to the interior of the protective housing 308 and components located therein (e.g., the sensor elements 310, 312, and associated wiring).

As shown, the sensor elements 310, 312 are electrically connected to or part of respective detection circuits 314, 316 by wiring 318. In some non-limiting embodiments, the sensor elements 310, 312 and the respective detection circuits 314, 316 form Wheatstone bridges. One or more of the sensor elements 310, 312 are arranged to experience various environmental conditions, such as vibration and thermal conditions that the downhole component 302 is exposed to during operation.

In one non-limiting example, a first sensor element 310 is arranged with electrical wiring passing through or on an interior surface of a sensor body, as described herein. The sensor body is a hollow body that defines an internal cavity. The sensor body includes at least one electrical wear element (e.g., a wire) passing through the internal cavity or installed along a surface of the internal cavity. In some embodiments, the electrical wear element(s) will pass through the sensor body from an interior to an exterior of the sensor body.

The internal cavity is at least partially filled with an abrasive substance that is selected to abrade, impact, or otherwise erode the wiring within the internal cavity. The wiring within the internal cavity (or interior wiring) is electrically connected to the wiring 318 and the detection circuit 314, thus completing a circuit. As the interior wiring is eroded or damaged by the abrasive substance, the electrical conductivity of the interior wiring will decrease (or stop if the interior wiring breaks) which can thus disconnect the detection circuit 314, which in turn can trigger a notification or other alarm that indicates that the downhole component 302 has been subjected to sufficient downhole environmental conditions to warrant maintenance (e.g., inspection, repair, replacement, etc.). In another non-limiting example, such as an alternative to real-time monitoring, a passive sensor can be measured, checked, or otherwise inspected upon return to the surface. The cumulative damage to the electrical elements in the sensor acts as a physical memory that does not require any electrical power to store or maintain the memory and which is utilized here in lieu of expensive and/or temperature sensitive computer memory, which could continually record accelerometer readings. Embodiments provided herein can be used to predict a remaining useful lifetime for a monitored system or device, than thus enable predictive maintenance programs and scheduling. Because the interior wiring can be used to represent fatigue on the downhole component 302 and such monitoring should be isolated with respect to other influences, the sensor body can be formed from an electrically insulating material to prevent unintended electrical connections.

The sensor elements 310, 312 operate by being exposed to the same conditions as the downhole component 302 to which they are fixedly connected. As such, when the downhole component 302 vibrates, the sensor elements 310, 312 will also vibrate. Similarly, if the downhole component 302 is exposed to high temperatures that may impact the elements of the downhole component 302 (e.g., wiring, metal parts, circuitry, etc.) the sensor elements 310, 312 will also be exposed to such temperatures. In some embodiments, the second sensor element 312 can be a control or reference sensor element 312 that does not include an abrasive substance therein and thus can operate as a test or comparison against the first sensor element 310.

In one non-limiting example of a sensor element of the present disclosure, three-dimensional monitoring of forces or conditions that impact the downhole component to which a sensor assembly is connected or attached is enabled. In order to measure cumulative vibration exposure in three-dimensions, each of an X-, Y-, and Z-axis or direction can be arranged with three electrical wear elements (e.g., three wires) within the internal cavity of the sensor body, with each of the three wires extending along a respective X-axis, Y-axis, and Z-axis. Erosion is greatest when the mobilized abrasive substance hits, impacts, or otherwise contacts an electrical wear element perpendicular to the axis of the impacted electrical wear element. Accordingly, having electrical wear elements arranged along all three principle direction allows distinguishing damage done by vibration along each direction. Through experimentation, modeling, etc. the properties and characteristics of the abrasive substance (e.g., particle size, hardness, quantity, etc.) and the properties and characteristics of the electrical wear elements (e.g., diameter, thickness, softness of material, etc.) can be selected to optimally mimic a lifetime degradation of a downhole component that is being monitored and to enable accurate estimation of a remaining lifetime of such downhole component.

The different interior electrical wear elements, when arranged as wires, can, at various points in time, be connected to a Wheatstone bridge, which may include the electrical wear elements in the reference sensor element 312, in order to sensitively measure any increase in the resistance of the interior electrical wear elements that may result from erosion of the interior electrical wear elements. That is, as the abrasive substance interacts with the interior electrical wear elements, material of the interior electrical wear elements can be removed or abraded, thus reducing the diameter or size of the electrical wear element (or breaking it), which in turn will increase the resistance of the electrical wear elements, which is a measurable characteristic.

The interior electrical wear elements may be made of an electrically-conducting material, which is selected to be eroded or abraded by the abrasive substance. For example, the interior wiring may be formed from aluminum. The abrasive substance is a material selected to scratch, cut, abrade, erode, or otherwise reduce the amount of material of the interior wiring due to impacts of the abrasive substance with the interior electrical wear element. For example, the abrasive substance can be formed from a granulated silicon carbide, having a Moh hardness of 9. In another example, industrial diamond grit, having a Moh hardness of 10, can be used as the abrasive substance.

In some embodiments, a communication device can be electrically connected to the detection circuits 314, 316. If a detected or measured resistance within the detection circuits 314, 316 exceeds a predetermined threshold, a message can be triggered to be sent to a surface operator that the specific downhole component 302 is approaching a maintenance state (e.g., wear on the downhole component 302 is projected to have reached a state of requiring a maintenance operation). In other arrangements, a measuring or testing tool can be connected to the detection circuits 314, 316 when the downhole tool 302 is brought to the surface (e.g., tripped from a borehole).

Figure 4:
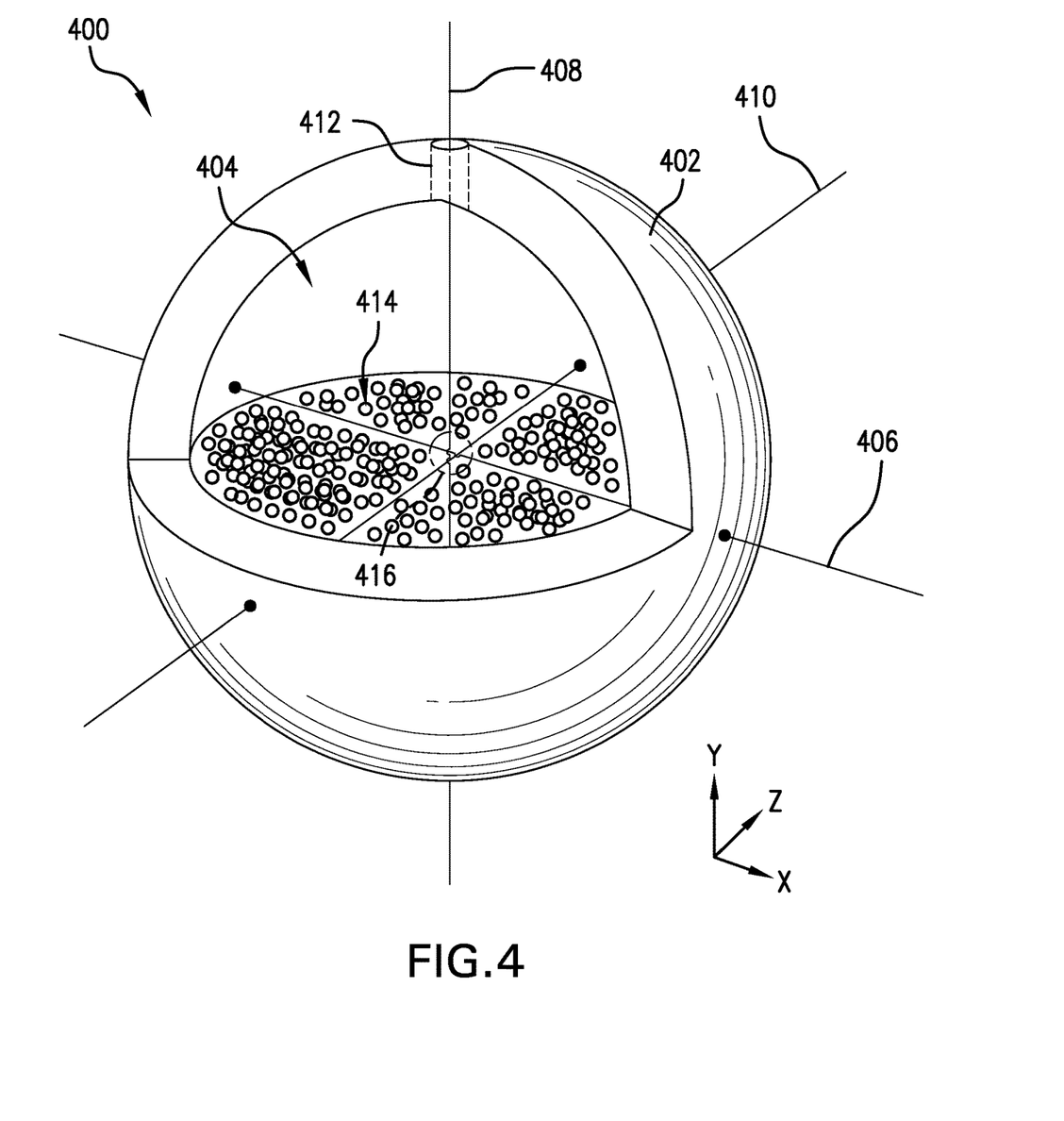
FIG. 4 is a partial-cutaway schematic illustration of a sensor element in accordance with an embodiment of the present disclosure.

Turning now to FIG. 4, a schematic illustration of a sensor element 400 in accordance with an embodiment of the present disclosure is shown. The sensor element 400 can be mounted to or otherwise affixed to a downhole component to enable monitoring of wear due to vibrations and/or temperature that the downhole component is exposed to. The sensor element 400 includes a sensor body 402 that defines a hollow internal cavity 404. As shown, the sensor body 402 is spherical in shape, although other shapes, configurations, geometries, etc. can be employed without departing from the scope of the present disclosure. The sensor body 402 has a plurality of electrical wear elements passing therethrough, with the electrical wear elements extending along X-, Y-, and Z-axes to enable three-dimensional monitoring. As shown, a first electrical wear element 406 extends along an X-axis, a second electrical wear element 408 extends along a Y-axis, and a third electrical wear element 410 extends along a Z-axis and these three wear elements (e.g., wires) are slightly offset so that they do not contact each other near the center of the sensor body 402 (e.g., sphere).

The sensor body 402 is formed from an insulating material such that the only electrical conduction into or out of the internal cavity 404 is through the electrical wear elements 406, 408, 410 which pass through the sensor body 402. As shown, the electrical wear electrical wear elements 406, 408, 410 pass from the internal cavity 404, through the sensor body 402, and to an exterior of the sensor body 402 where such electrical wear elements 406, 408, 410 can be electrically connected to other electrical elements or accessible to be selectively connected to.

For example, the electrical wear elements 406, 408, 410 can each be connected to an independent or dedicated detection circuit, either continuously or on demand. As schematically shown with respect to the second electrical wear element 408, the electrical wear element 408 may optionally pass through an insulated portion 412 of the sensor body 402. The insulated portion 412 may be a plug or other part of the sensor body 402 that is arranged to support the second electrical wear element 408 as it passes through the sensor body 402 and can also provide rigid or structural support to prevent the second electrical wear element 408 from breaking at the points where the second electrical wear element 408 enters and exits the sensor body 402. In embodiments having the insulating portion 412 of the sensor body 402, the sensor body 402 can be formed with any desirable material, even, optionally, an electrically conductive material, with the insulating portion 412 electrically isolating and insulating the electrical wear elements 406, 408, 410 at the locations where the electrical wear elements 406, 408, 410 pass through the sensor body 402.

The internal cavity 404 of the sensor body 402 is at least partially filled with an abrasive substance 414. The abrasive substance 414 is selected to abrade, impact, or otherwise erode the material of the electrical wear elements 406, 408, 410 such that as the electrical wear elements 406, 408, 410 are impacted by the abrasive substance 414 the material of the electrical wear elements 406, 408, 410 is removed and an electrical resistance is increased (e.g., when tested by a connected detection circuit). The impact of the abrasive substance 414 against the electrical wear elements 406, 408, 410 is caused by movement (e.g., vibrations) of the sensor body 402. As the sensor body 402 vibrates, the abrasive substance 414 will be moved within the internal cavity 404 of the sensor body 402.

In one example embodiment, the abrasive substance 414 is a particulate or granular material (e.g., a grit material) that, as the sensor body 402 is vibrated, the particles of the abrasive substance 414 are jostled and mobilized by shock and vibrations into contact with the electrical wear elements 406, 408, 410. As the particles impact the electrical wear elements 406, 408, 410, the material of the electrical wear elements 406, 408, 410 will be removed, thus increasing a resistance of the electrical wear elements 406, 408, 410, which can be measured using a detection circuit, such as a Wheatstone bridge. The erosion of the material of the electrical wear elements 406, 408, 410 causes the electrical resistance of electrical wear elements 406, 408, 410 to individually or separately cumulatively and permanently increase. An erosion rate of the electrical wear elements 406, 408, 410 can depend upon an angle at which an object (e.g., the electrical wear elements 406, 408, 410) is struck by an object (e.g., the abrasive substance 414). As such, as shown in the embodiment of FIG. 4, the sensor element 400 is arranged to provide separate cumulative X-, Y-, and Z-axis vibration exposure measurements by having the electrical wear elements 406, 408, 410 as arranged as shown and described above.

Those of skill in the art will appreciate that the number of electrical wear elements installed in a sensor element of the present disclosure is not limited to three, as shown. That is, any number of electrical wear elements can be installed within sensor bodies of the present disclosure. In some embodiments, a single electrical wear element can be arranged passing through an internal cavity of a sensor body. In some such embodiments, a single dimension of wear monitoring can be provided. Further, any number of sensor elements can be installed to one or more downhole components.

As shown in FIG. 4, the electrical wear elements 406, 408, 410 are arranged as wires passing through the sensor element 400 along respective X-, Y-, and Z-axes. Because the electrical wear elements 406, 408, 410 are electrically conductive, and it is desirable to monitor vibration or wear in a direction of each of the respective X-, Y-, and Z-axes, the electrical wear elements 406, 408, 410 are positioned to not contact each other at a center 416 of the sensor element 400. That is, the electrical wear elements 406, 408, 410 are arranged to be offset from each other such that no electrical contact occurs between the electrical wear elements 406, 408, 410.

The abrasive substance of the present disclosure can be particulate material, a fluid, a combination of fluid and solid (e.g., suspended particulate), a gas or liquid that changes material or phase state depending on temperature, etc. In some embodiments, the abrasive substance will fill less than the entire internal cavity of the sensor body. In one non-limiting example, the volume of the internal cavity is 50% filled by the abrasive substance. In another embodiment, such as with liquid-suspended particulates, the entire (100%) internal cavity can be filled with the abrasive liquid suspension. Examples of potential particulate abrasive substances includes, but are not limited to, glass, ceramic, steel (e.g., cut wire, shot, grit), aluminum oxide, silicon carbide, garnet, diamond, etc. The selection of the abrasive substance may be based on the particular material of the electrical wear elements, the amount of volume within the internal cavity of the sensor body, the material used to form the sensor body, or based on other considerations. One consideration is selecting an abrasive substance that will erode the electrical wear elements through impact at a predetermined or desired rate that is representative of a wear on other electronics of the downhole component to which the sensor element is installed.

Similarly, the material of the electrical wear elements can be selected for properties of wear based on exposure to the abrasive substance such that the wear of the electrical wear elements mimics or simulates wear or fatigue of one or more electronic components, such as circuit boards, of the downhole component to which the sensor element is installed. Thus, the selection of the material of the abrasive substance and the electrical wear elements can be selected in combination to achieve a desired wear pattern.

As noted, the selection of the abrasive substance can include liquids. One purpose for employing a liquid (either as a suspension fluid or as providing the abrasion) is to enable change in viscosity due to temperature. The change in viscosity can be tailored to mimic the increased damage potential of vibration at higher temperatures. This is possible because the erosion damage of particles in suspension will be higher at lower viscosity. In such embodiments, the sensor body can be formed from a material that is thermally conductive but electrically insulated. In suspension, one example configuration would be to fill the internal cavity with 1-Propanol. 1-Propanol is a liquid below about 97° C. and will boil at atmospheric pressure at about 97° C. If sealed in a fixed volume chamber above 97° C., the fraction of gas will continue to increase with temperature and the fraction of liquid will continue to decrease with temperature so that more of the abrasive substance will be slowed down by the less viscous gas and less of the abrasive substance will be slowed down by the more viscous liquid resulting in a more abrasive mixture with a temperature-dependent abrasiveness and thus can mimic the greater damage that downhole components experience when both heated and vibrated.

As such, if such a sensor element is installed on a downhole component and the downhole component is subject to vibrations and different temperatures, the erosion rate of the electrical wear elements can be variable based on the temperature. For example, when the downhole component is located in relatively low temperatures, such as at the surface or in early deployment stages, vibrations may not be as damaging, and thus the liquid state of a portion of the abrasive substance will prevent excessive damage/erosion to occur to the electrical wear elements. However, when the downhole component is located downhole and in operation and subject to the high downhole temperatures, more of the liquid portion will evaporate and become gaseous, at which time the suspended particles can more effectively impact the electrical wear elements. Another example fluid can be 1-Butanol, which has a boiling point at atmospheric pressure around 117° C.

Figure 5A:
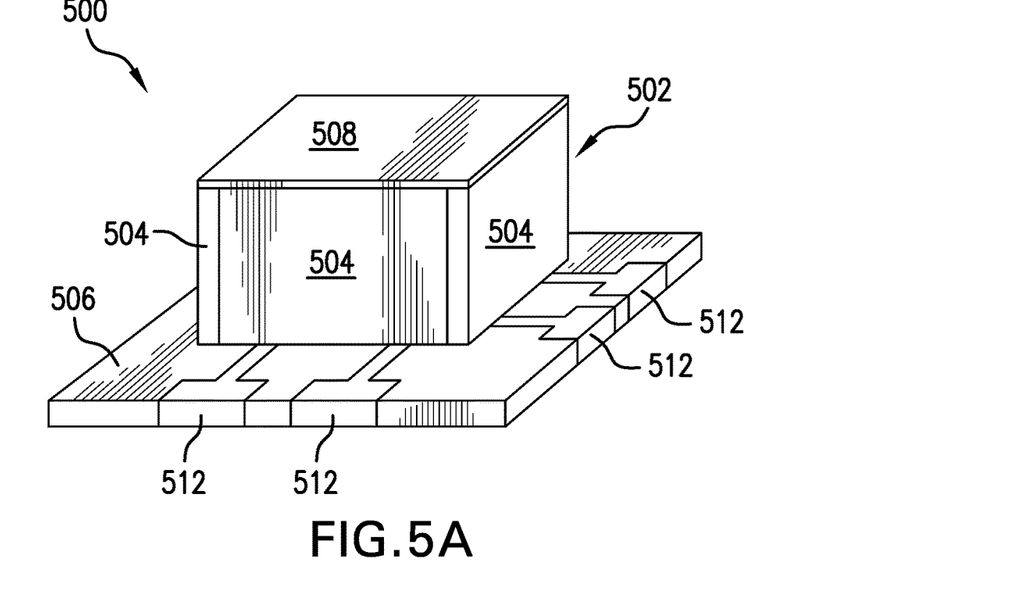
FIG. 5A is a schematic illustration of a sensor element in accordance with an embodiment of the present disclosure.
Figure 5B:
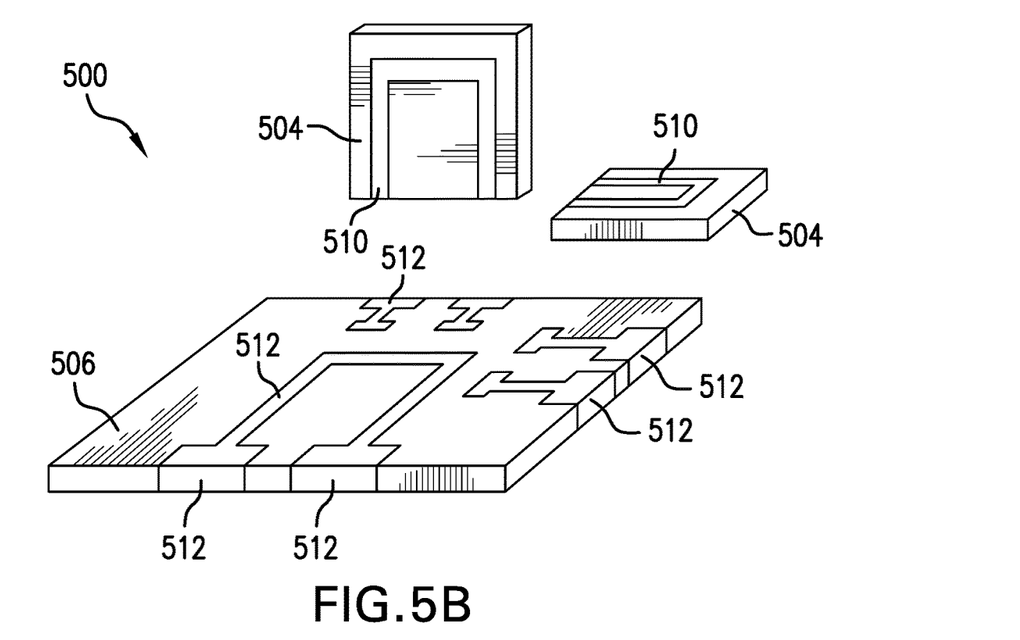
FIG. 5B is schematic illustration of some components of the sensor element of FIG. 5A.

Turning now to FIGS. 5A-5B, schematic illustrations of a sensor element 500 in accordance with an embodiment of the present disclosure is shown. In contrast to the above described embodiment with a spherically shaped sensor body, the sensor element 500 has a sensor body 502 that is cubic in shape. The sensor body 502 is formed from a plurality of plates 504. The plates 504 are mounted to a base 506 and can be capped by a top 508. Each of the plates 504 includes a first portion 510 of an electrical wear element. Similarly, the base 506 includes one or more second portions 512 of the electrical wear element, wherein the first portions 510 and the second portions 512 are electrically connectable to form one or more electrical wear elements within the sensor body 502. As illustratively shown, a part of the second portion 512 on the base 506 forms a first direction portion of an electrical wear element, and each of the first portions 510 shown in FIG. 5B represent other directional portions such that a three-dimensional sensor element 500 can be assembled. In some embodiment, any or all of the plates 504, the base 506, and/or the top 508 can include portions of an electrical wear element.

The sensor element 500 can be filled with an abrasive substance similar to that described above. In one non-limiting example, the sensor element 500, as shown, forms a box made from ceramic plates that include conductive (e.g., metallic) tracks (e.g., the portions 510, 512) that form the electrical wear element(s). The portions 510, 512 can be worn off by impacts or contact with the abrasive substance, similar to that described above. As such, in some embodiments, the electrical wear element(s) can be "grind off structures" wherein the material of the portions 510, 512 are worn or chipped away, with an increase in resistance resulting therefrom, similar to the wire arrangement described above. The second portions 512 extend to an edge of the base 506 and enable electrical connected to a printed circuit board to which the sensor element 500 is attached, or enables on-demand connected to a volt-meter, ohm-meter, or other electrical testing device. Although the second portions 512 in FIGS. 5A-5B are shown in a particular arrangement, those of skill in the art will appreciate that the second portions that are located on the base and/or the first portions located on the plates can have any arrangement or configuration, without departing the scope of the present disclosure.

In an example of the sensor element 500 of FIGS. 5A-5B, the internal cavity of the cubic sensor element 500 can be filled with a fluid with suspended particles therein, similar to that described above. As will be appreciated by those of skill in the art in view of the above disclosure, any type of fluid, including mineral oils, can be used with a selected evaporation point that is selected for specific temperatures and/or viscosity properties. That is, the fluid can be selected to change phase (e.g., liquid to gas, supercritical phase change, etc.) at a predetermined temperature.

For example, in another example using the cubic sensor element 500, the internal cavity can be filled with propane, which has a critical temperature close to 96.7° C., which is about the minimum temperature of most boreholes near bottomhole. The plates 504 can be about 10 mm tall, and capped with a top 508. The first portions 510 on the plates 504 can be partially submerged with a fluid suspension having about 5 mm (i.e., about half the height of the plates 504) filled with a grit and about 4 mm column of liquid propane at room temperature contained within the internal cavity. Initially, at room temperature in this example, about 80% of the grit is immersed in the viscous liquid propane and only 20% of the grit is in a low viscosity vapor (i.e., above the liquid level within the internal cavity). The 20% that is not submerged will be free to move and 80% that is submerged will have highly dampened motion. However, above the critical temperature of 96.7° C., the propane will become supercritical and thus all of the grit will now be located within a supercritical fluid that has lower viscosity than the liquid (but a higher viscosity than propane vapor). Although the above description is made with respect to propane, other fluids can be used without departing from the scope of the present disclosure. For example, various nonflammable and nontoxic fluids with a supercritical temperature around 100° C. can be employed. Some such examples can halocarbon be refrigerants (e.g., R12, R22, and R134a), which are commonly known as Freons.

Advantageously, embodiments provided herein are directed to passive monitoring systems that enable monitoring of wear of downhole components, where such monitoring is performed in situ. The monitoring systems are arranged to enable erosion of electrical wear elements due to environmental conditions, such as vibrations and thermal conditions. Through erosion of the electrical wear elements and testing a resistance in a testing device electrically connected to the electrical wear elements, a resistance can be measured with the resistance representing or indicating an amount of wear of the electrical wear elements. As the erosion of the electrical wear elements increases, so does the resistance when connected to a testing circuit, such as a Wheatstone bridge.

Through simulations, testing, and observation, it can be determined when a specific resistance is measured that a downhole component has been subject to too much vibration or other environmental condition. The electrical wear elements and an abrasive substance can be selected to accurately match the specific sensor element to a downhole component that is to be monitored. Various geometric shapes of sensor bodies can be employed to enable different physical properties or to fit with a particular downhole component to be monitored.

Embodiment 1

A sensor element for indirect monitoring of cumulative damage to downhole components, the sensor element comprising: a sensor body defining an internal cavity; at least one electrical wear element located within the sensor body, wherein a portion of the at least one electrical wear element electrically extends from the internal cavity, through the sensor body, and to an exterior of the sensor body; and an abrasive substance located within the internal cavity, the abrasive substance moveable within the internal cavity to contact and erode material of the at least one electrical wear element, wherein erosion of the at least one electrical wear element causes a resistance of the at least one electrical wear element to increase.

Embodiment 2

The sensor element of any embodiment herein, wherein the at least one electrical wear element is a wire passing through the internal cavity.

Embodiment 3

The sensor element of any embodiment herein, wherein the at least one electrical wear element comprises three wires, each wire passing through the internal cavity, wherein one of each of the three wires extends along an X-axis, a Y-axis, and a Z-axis.

Embodiment 4

The sensor element of any embodiment herein, wherein the three wires are arranged such that no electrical contact occurs between the three wires.

Embodiment 5

The sensor element of any embodiment herein, wherein the sensor body is spherical in shape.

Embodiment 6

The sensor element of any embodiment herein, wherein the sensor body is a cubic shaped sensor body.

Embodiment 7

The sensor element of any embodiment herein, wherein the sensor body comprises a plurality of plates, wherein at least a first portion of the at least one electrical wear element is formed along an interior surface at least one of the plurality of plates facing the internal cavity.

Embodiment 8

The sensor element of any embodiment herein, wherein the sensor body further comprises a base and each of the plurality of plates is mounted to the base to define the cubic shaped sensor body, and wherein a second portion of the at least one electrical wear element is arranged on the base.

Embodiment 9

The sensor element of any embodiment herein, wherein the abrasive substance comprises at least one of grit and particulate material.

Embodiment 10

The sensor element of any embodiment herein, wherein the abrasive substance comprises a fluid and a particulate material, wherein the particulate material is suspended within the fluid.

Embodiment 11

The sensor element of any embodiment herein, wherein the fluid comprises a supercritical fluid.

Embodiment 12

The sensor element of any embodiment herein, wherein the fluid is selected to change phase at a predetermined temperature.

Embodiment 13

The sensor element of any embodiment herein, wherein the sensor body is formed from a material that is electrically insulating and thermally conductive.

Embodiment 14

The sensor element of any embodiment herein, wherein the sensor body is electrically insulating.

Embodiment 15

The sensor element of any embodiment herein, wherein the sensor body comprises an insulated portion, where at least one electrical wear element passes through the sensor body at the insulated portion.

Embodiment 16

A monitoring system comprising: a downhole component comprising at least one electrical element, wherein the downhole component is arranged as part of a downhole tool for deployment into a borehole; and a sensor assembly mounted to the downhole component, wherein the sensor assembly comprises: at least one sensor element having a sensor body defining an internal cavity; at least one electrical wear element located within the sensor body, wherein a portion of the at least one electrical wear element electrically extends from the internal cavity, through the sensor body, and to an exterior of the sensor body; and an abrasive substance located within the internal cavity, the abrasive substance moveable within the internal cavity to contact and erode material of the at least one electrical wear element, wherein erosion of the at least one electrical wear element causes a resistance of the at least one electrical wear element to increase.

Embodiment 17

The monitoring system of any embodiment herein, wherein the at least one sensor element comprises a first sensor element and a second sensor element, wherein the first sensor element include the abrasive substance therein and the second sensor element is a reference sensor element that does not contain the abrasive substance therein.

Embodiment 18

The monitoring system of any embodiment herein, further comprising a protective housing, wherein the at least one sensor element is housed within the protective housing.

Embodiment 19

The monitoring system of any embodiment herein, wherein the downhole component is a printed circuit board.

Embodiment 20

The monitoring system of any embodiment herein, wherein the abrasive substance comprises a fluid and a particulate material, wherein the particulate material is suspended within the fluid.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semisolids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A sensor element for indirect monitoring of cumulative damage to downhole components, the sensor element comprising:
   a sensor body defining an internal cavity, wherein the internal cavity is enclosed by the sensor body;
   at least one electrical wear element located within the sensor body, wherein a portion of the at least one electrical wear element electrically extends from the internal cavity, through the sensor body, and to an exterior of the sensor body, wherein the at least one electrical wear element is configured as a branch of a Wheatstone Bridge; and
   an abrasive substance at least partially filling and contained within the internal cavity, the abrasive substance moveable within the internal cavity to contact and erode material of the at least one electrical wear element, wherein erosion of the at least one electrical wear element causes a resistance of the at least one electrical wear element to increase, wherein the sensor body is configured to prevent the abrasive substance from leaving the internal cavity,
   wherein the abrasive substance is configured to interact with the at least one electrical wear element within the enclosed internal cavity such that material of the at least one electrical wear element is removed or abraded by the interaction, wherein said interaction reduces a diameter or size of the at least one electrical wear element and increases the electrical resistance of the at least one electrical wear element.

2. The sensor element of claim 1, wherein the at least one electrical wear element is a wire passing through the internal cavity.

3. The sensor element of claim 1, wherein the at least one electrical wear element comprises three wires, each wire passing through the internal cavity, wherein one of the three wires extends along an X-axis, one of the three wires extends along a Y-axis, and one of the three wires extends along a Z-axis.

4. The sensor element of claim 3, wherein the three wires are arranged such that no electrical contact occurs between the three wires.

5. The sensor element of claim 1, wherein the sensor body is one of spherical in shape or cubic in shape.

6. The sensor element of claim 1, wherein, at room temperature, the abrasive substance comprises a liquid portion and a low viscosity vapor portion with particles suspended therein.

7. The sensor element of claim 1, wherein the sensor body comprises a plurality of plates arranged to form a cubic shaped sensor, wherein at least a first portion of the at least one electrical wear element is formed along an interior surface at least one of the plurality of plates facing the internal cavity.

8. The sensor element of claim 7, wherein the sensor body further comprises a base and each of the plurality of plates is mounted to the base to define the cubic shaped sensor body, and wherein a second portion of the at least one electrical wear element is arranged on the base.

9. The sensor element of claim 1, wherein the abrasive substance comprises at least one of grit and particulate material.

10. The sensor element of claim 1, wherein the abrasive substance comprises a fluid and a particulate material, wherein the particulate material is suspended within the fluid.

11. The sensor element of claim 10, wherein the fluid comprises a supercritical fluid.

12. The sensor element of claim 10, wherein the fluid is selected to change phase at a predetermined temperature.

13. The sensor element of claim 10, wherein the sensor body is formed from a material that is electrically insulating and thermally conductive.

14. The sensor element of claim 1, wherein the sensor body is electrically insulating.

15. The sensor element of claim 1, wherein the sensor body comprises an insulated portion, where at least one electrical wear element passes through the sensor body at the insulated portion.

16. A monitoring system comprising:
   a downhole component comprising at least one electrical element, wherein the downhole component is arranged as part of a downhole tool for deployment into a borehole; and
   a sensor assembly mounted to the downhole component, wherein the sensor assembly comprises:
      at least one sensor element having a sensor body defining an internal cavity, wherein the internal cavity is enclosed by the sensor body;
      at least one electrical wear element located within the sensor body, wherein a portion of the at least one electrical wear element electrically extends from the internal cavity, through the sensor body, and to an exterior of the sensor body, wherein the at least one electrical wear element is configured as a branch of a Wheatstone Bridge; and
      an abrasive substance at least partially filling and contained within the internal cavity, the abrasive substance moveable within the internal cavity to contact and erode material of the at least one electrical wear element, wherein erosion of the at least one electrical wear element causes a resistance of the at least one electrical wear element to increase, wherein the sensor body is configured to prevent the abrasive substance from leaving the internal cavity,
      wherein the abrasive substance is configured to interact with the at least one electrical wear element within the enclosed internal cavity such that material of the at least one electrical wear element is removed or abraded by the interaction, wherein said interaction reduces a diameter or size of the at least one electrical wear element and increases the electrical resistance of the at least one electrical wear element.

17. The monitoring system of claim 16, wherein the at least one sensor element comprises a first sensor element and a second sensor element, wherein the first sensor element include the abrasive substance therein and the second sensor element is a reference sensor element that does not contain the abrasive substance therein.

18. The monitoring system of claim 17, further comprising a protective housing, wherein the at least one sensor element is housed within the protective housing.

19. The monitoring system of claim 16, wherein the downhole component is a printed circuit board.

20. The monitoring system of claim 16, wherein the abrasive substance comprises a fluid and a particulate material, wherein the particulate material is suspended within the fluid.

* * * * *